United States Patent
Zhang et al.

(10) Patent No.: US 10,764,592 B2
(45) Date of Patent: Sep. 1, 2020

(54) INTER-LAYER RESIDUAL PREDICTION

(71) Applicant: Intel Corporation, Santa Clara, CA (US)

(72) Inventors: Wenhao Zhang, Beijing (CN); Yi-Jen Chiu, San Jose, CA (US); Lidong Xu, Beijing (CN); Yu Han, Beijing (CN); Zhipin Deng, Beijing (CN); Xiaoxia Cai, Beijing (CN)

(73) Assignee: Intel Corporation, Santa Clara, CA (US)

( * ) Notice: Subject to any disclaimer, the term of this patent is extended or adjusted under 35 U.S.C. 154(b) by 367 days.

(21) Appl. No.: 13/996,577

(22) PCT Filed: Sep. 28, 2012

(86) PCT No.: PCT/CN2012/082312
§ 371 (c)(1),
(2) Date: Jun. 21, 2013

(87) PCT Pub. No.: WO2014/047877
PCT Pub. Date: Apr. 3, 2014

(65) Prior Publication Data

US 2015/0163499 A1   Jun. 11, 2015

(51) Int. Cl.
*H04N 11/04* (2006.01)
*H04N 19/187* (2014.01)
(Continued)

(52) U.S. Cl.
CPC ......... *H04N 19/187* (2014.11); *H04N 19/103* (2014.11); *H04N 19/117* (2014.11);
(Continued)

(58) Field of Classification Search
CPC .. H04N 19/103; H04N 19/117; H04N 19/147; H04N 19/176; H04N 19/30; H04N 19/463; H04N 19/50; H04N 19/61
(Continued)

(56) References Cited

U.S. PATENT DOCUMENTS

| | | | |
|---|---|---|---|
| 2006/0268991 A1* | 11/2006 | Segall | H04B 1/66 375/240.24 |
| 2007/0121723 A1 | 5/2007 | Mathew et al. | |

(Continued)

FOREIGN PATENT DOCUMENTS

| | | |
|---|---|---|
| CN | 101584217 | 11/2009 |
| CN | 101702963 | 5/2010 |

(Continued)

OTHER PUBLICATIONS

International Search Report and Written Opinion received for PCT Patent Application No. PCT/CN2012/082312, dated Jul. 11, 2013, 10 pages.

(Continued)

*Primary Examiner* — Jamie J Atala
*Assistant Examiner* — Patrick E Demosky
(74) *Attorney, Agent, or Firm* — Green, Howard & Mughal LLP.

(57) ABSTRACT

Systems, devices and methods are described including performing scalable video coding using inter-layer residual prediction. Inter-layer residual prediction in an enhancement layer coding unit, prediction unit, or transform unit may use residual data obtained from a base layer or from a lower enhancement layer. The residual may be subjected to upsample filtering and/or refinement filtering. The upsample or refinement filter coefficients may be predetermined or may be adoptively determined.

30 Claims, 8 Drawing Sheets

(51) Int. Cl.
*H04N 19/463* (2014.01)
*H04N 19/61* (2014.01)
*H04N 19/30* (2014.01)
*H04N 19/103* (2014.01)
*H04N 19/117* (2014.01)
*H04N 19/147* (2014.01)
*H04N 19/176* (2014.01)
*H04N 19/50* (2014.01)
*H04N 19/59* (2014.01)

(52) U.S. Cl.
CPC ......... *H04N 19/147* (2014.11); *H04N 19/176* (2014.11); *H04N 19/30* (2014.11); *H04N 19/463* (2014.11); *H04N 19/50* (2014.11); *H04N 19/61* (2014.11); *H04N 19/59* (2014.11)

(58) Field of Classification Search
USPC .................................................. 375/240.02
See application file for complete search history.

(56) References Cited

U.S. PATENT DOCUMENTS

| | | | |
|---|---|---|---|
| 2007/0160137 A1* | 7/2007 | Guo | H04N 19/176 375/240.1 |
| 2007/0171969 A1 | 7/2007 | Han et al. | |
| 2008/0056356 A1* | 3/2008 | Wang | H04N 19/105 375/240.12 |
| 2008/0089411 A1 | 4/2008 | Wenger et al. | |
| 2008/0123742 A1 | 5/2008 | Xu et al. | |
| 2008/0165850 A1* | 7/2008 | Sagetong | H04N 19/33 375/240.15 |
| 2008/0225952 A1 | 9/2008 | Wang et al. | |
| 2008/0267291 A1 | 10/2008 | Vieron et al. | |
| 2010/0061447 A1* | 3/2010 | Tu | H04N 21/234381 375/240.03 |
| 2010/0215095 A1 | 8/2010 | Hayase et al. | |
| 2011/0274178 A1* | 11/2011 | Onno | H04N 19/70 375/240.25 |
| 2011/0286526 A1* | 11/2011 | Nakagami | H04N 19/44 375/240.16 |
| 2013/0039428 A1* | 2/2013 | Lakshman | H04N 19/61 375/240.16 |
| 2014/0044178 A1* | 2/2014 | Li | H04N 19/00569 375/240.16 |
| 2014/0072041 A1* | 3/2014 | Seregin | H04N 19/00569 375/240.13 |
| 2014/0085415 A1* | 3/2014 | Bici | H04N 19/00769 348/43 |
| 2015/0103900 A1* | 4/2015 | Liu | H04N 19/31 375/240.12 |

FOREIGN PATENT DOCUMENTS

| | | |
|---|---|---|
| CN | 102088605 A | 6/2011 |
| EP | 2911397 | 8/2015 |
| KR | 20070092179 | 9/2007 |
| KR | 2008-0089633 A | 10/2008 |
| KR | 20100066560 | 6/2010 |
| KR | 20110066523 | 6/2011 |
| WO | 2007/080480 A2 | 7/2007 |

OTHER PUBLICATIONS

Notice of Preliminary Rejection for Korean Patent Application No. 2015-7004821 dated Nov. 12, 2015.
Office Action for Chinese Patent Application No. 201280075457.8, dated Mar. 2, 2017.
Extended European Search Report for European Patent Application No. 12885732.3 dated Apr. 26, 2016, 11 pages.
International Preliminary Report on Patentability for International Patent Application No. PCT/CN2012/082312 dated Mar. 31, 2015, 5 pages.
Notice of Allowance for Korean Patent Application No. 2015-7004821 dated May 28, 2016, 3 pages.
Notice of Allowance for Singapore Patent Application No. 11201500314W dated Jul. 12, 2017.
Office Action for European Patent Application No. 12885732.3, dated Apr. 12, 2018.
Office Action for Chinese Patent Application No. 201280075457.8, dated Mar. 28, 2019.
Third Office Action for Chinese Patent Application No. 201280075457.8, dated Aug. 3, 2018.
Wang, X. et al., "Improved Video Coding with Residual Prediction for Extended Spatial Scalability", ISCCSP 2008, Malta, pp. 1041-1046; Mar. 12-14, 2008.

* cited by examiner

INTER-LAYER RESIDUAL PREDICTION

BACKGROUND

High Efficiency Video Coding (HEVC), currently under development by the Joint Collaborative Team on Video Coding (JCT-VC) formed by ISO/IEC Moving Picture Expert Group (MPEG) and ITU-T Video Coding Experts Group (VCEG), is a video compression standard projected to be finalized in 2012. Similar to previous video coding standards, HEVC includes basic functional modules such, as intra/inter prediction, transform, quantization, in-loop filtering, and entropy coding.

HEVC defines Coding Units (CUs) as picture sub-partitions that take the form of rectangular blocks having variable sizes. Within each CU, a quad-tree based splitting scheme specifies the CU partition pattern. HEVC also defines Prediction Units (PUs) and Transform Units (TUs) that specify how a given CU is to be partitioned for prediction and transform purposes, respectively. After intra or inter prediction, transform operations are applied to residual blocks to generate coefficients. The coefficients are then quantized, scanned into one-dimensional order and, finally, entropy encoded.

HEVC is expected to include a Scalable Video Coding (SVC) extension. An HEVC SVC bitstream provides several subset bitstreams representing the source video content at different spatial resolutions, frame rates, quality, bit depth, and so forth. Scalability is then achieved using a multi-layer coding structure that, in general, includes a Base Layer (BL) and at least one Enhancement Layer (EL). This permits a picture, or portions of a picture such as a PU, belonging to an EL to be predicted from lower layer pictures (e.g., a BL picture) or from previously coded pictures in the same layer. In conventional approaches, prediction, for a current PU is performed with respect to PUs of pictures within the same layer. For instance, residual prediction for an EL PU is conventionally performed with respective to PUs of the same EL and not of another EL or of the BL.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
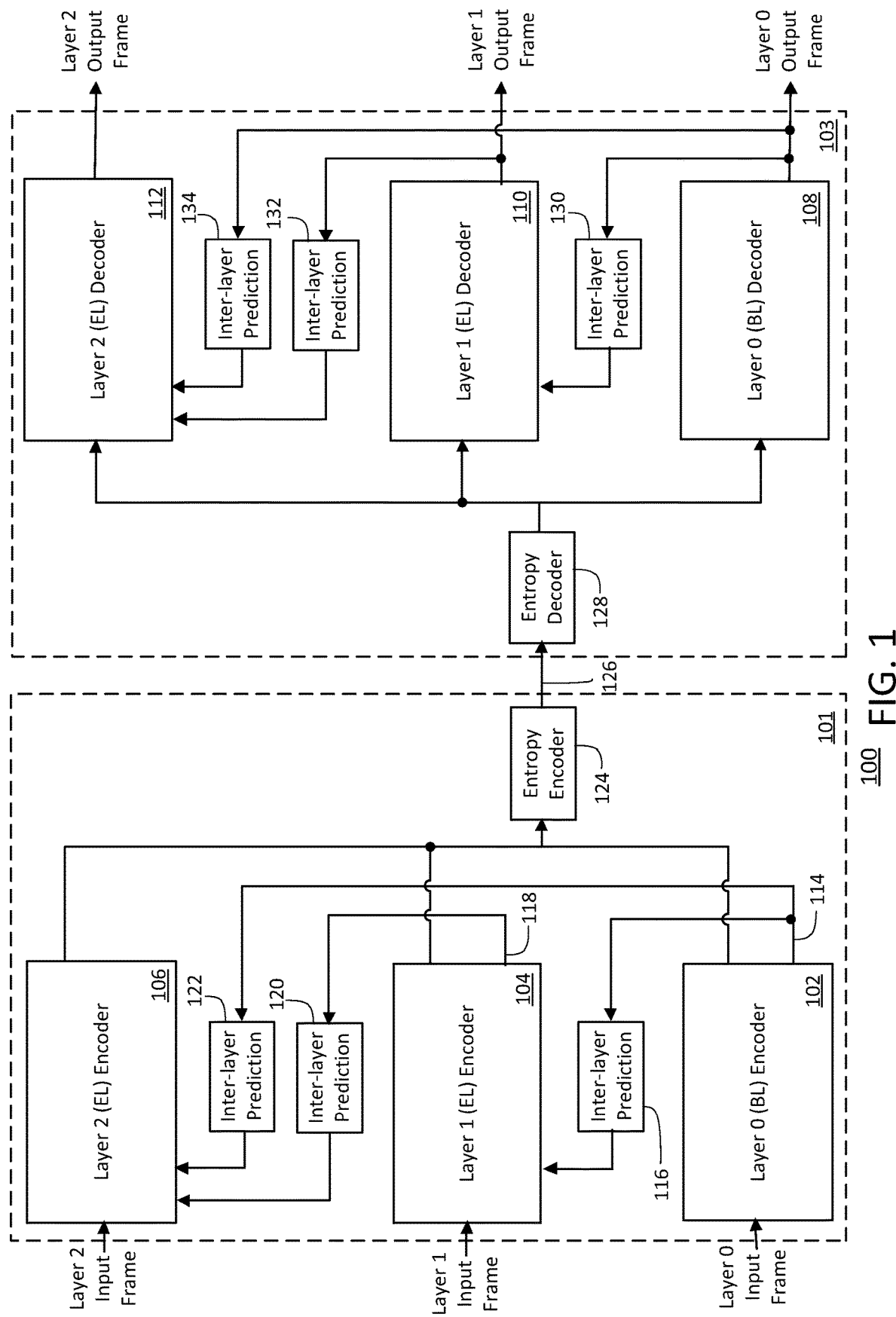
FIG. 1 is an illustrative diagram of an example coding system.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than, what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In order instances, some material such as, for example, control structures and full software instruction, sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below including operations for video coding employing inter-layer residual prediction.

As used herein, the term "coder" may refer to an encoder and/or a decoder. Similarly, as used herein, the term "coding" may refer to encoding via an encoder and/or decoding via a decoder. For example a video encoder and video decoder may both be examples of coders capable of coding, in addition, as used herein, the term "codec" may refer to any process, program or set of operations, such as, for example, any combination of software, firmware, and/or hardware, that may implement an encoder and/or a decoder.

In scalable video coding systems, multi-layered coding is used to support several kinds of scalabilities including spatial scalability, temporal scalability, quality scalability, bit-depth scalability and so forth, in accordance with the present disclosure, various inter-layer residual prediction schemes may be used to increase coding efficiency and/or coding flexibility in scalable video coding systems.

FIG. 1 illustrates an example scalable video coding (SVC) coding system 100 in accordance with the present disclosure. In various implementations, system 100 may undertake video compression and decompression and/or implement video codecs according to one or more standards or specifications, such as, for example, the High Efficiency Video Coding (HEVC) standard (see ISO/IEC JTC/SC29/WG11 and ITU-T SG16 WP3, "High efficiency video coding (HEVC) text specification draft 8" (JCTVC-J1003_d7), July 2012) and any Scalable Video Coding (SVC) extension of thereof. Although system 100 and/or other systems, schemes or processes may be described herein in the context of an SVC extension of the HEVC standard, the present disclosure is not limited to any particular video encoding standard or specification or extensions thereof.

As illustrated, system 100 includes an encoder subsystem 101 having multiple video encoders including a Layer 0 or base layer (BL) encoder 102, a Layer 1 or first enhancement layer (EL) encoder 104, and a Layer 2 or second EL encoder 106. System 100 also includes corresponding video decoders of a decoder subsystem 103 including a Layer 0 (BL) decoder 108, a Layer 1 (EL) decoder 110, and a Layer 2 (EL) decoder 112. In general the BL may be HEVC compatible coded. When coding an EL with a layer identification (ID) equal to N, SVC coding schemes guarantee that ail coding layers having a layer ID less than N are available for use in inter-layer prediction schemes so that a picture belonging to a particular EL may be predicted from lower layer pictures (e.g., in a EL or a EL having a lower layer ID) or from previously coded pictures in the same layer.

In various implementations, HEVC specifies a Largest Coding Unit (LCU) for a picture that may then be partitioned into Coding Units (CDs) that take the form of rectangular blocks having variable sizes. Within each LCU, a quad-free based splitting scheme specifies the CU partition pattern. HEVC also defines Prediction Units (PUs) and Transform Units (TUs) that specify how a given CU is to be partitioned for prediction and transform purposes, respectively. A CU ordinarily includes one luma Coding Block (CB) and two chroma CBs together with associated syntax, and a PU may be further divided into Prediction Blocks (PBs) ranging in size from 64.times.64 samples down to 4.times.4 samples. As used, herein, the term "block" may refer to any partition or sub-partition of a video picture, for example, a block may refer to a PU or to a PB.

In accordance with the present disclosure, as will be explained in greater detail below, either or both of EL encoders 104 and 106 may use residuals obtained from either encoder 102 or 104 to perform inter-layer residual prediction. For example, in some implementations, encoder 104 may perform inter-layer residual prediction using a residual 114 obtained from encoder 102 and processed by inter-layer prediction module 116. In addition, in souse implementations, encoder 106 may perform inter-layer residual prediction using either residual 114 or residual 118 obtained, respectively, from encoder 102 or encoder 104 and processed, respectively, by inter-layer prediction module 120 or inter-layer prediction module 122.

As used herein the term "inter-layer residual prediction" refers to inter prediction of an enhancement layer picture using residual data obtained from a reference layer picture. Further, as used herein, a "residual" refers to a residual signal or collection of residual data that may be generated by subtracting a reconstructed frame from a received, or original frame. By reusing coding information such as a residual generated by a reference layer, inter-layer residual prediction may improve the compression efficiency and coding flexibility of an SVC system, such as system 100, and/or a codec design. In various implementations in accordance with the present disclosure, inter-layer residual prediction may be applied in any combination of temporal, spatial and/or quality scalable video coding applications.

Employing any one or more of inter-layer prediction modules 116, 120 and/or 122, encoders 102, 104 and 106 may provide separate bitstreams to an entropy encoder 124. Entropy encoder 124 may then provide a compressed bitstream 126, including multiple layers of scalable video content, to an entropy decoder 128 of decoder subsystem 103. In accordance with the present disclosure, as will also be explained in greater detail below, either or both of EL decoders 110 and 112 may use residuals obtained from either decoder 108 or 110 to perform inter-layer residual prediction. For example, in some implementations, decoder 110 may perform inter-layer residual prediction using a residual obtained from decoder 108 and processed by inter-layer prediction module 130. In addition, in some implementations, decoder 112 may perform inter-layer residual prediction using residuals obtained, respectively, from either decoder 108 or decoder 110 and processed, respectively, by inter-layer prediction module 132 or inter-layer prediction module 134.

While FIG. 1 illustrates system 100 as employing three layers of scalable video content and corresponding sets of three encoders in subsystem 101 and three decoders in subsystem 103, any number of scalable video coding layers and corresponding encoders and decoders may be utilized in accordance with the present disclosure. Further, while system 100 depicts certain components the present disclosure is not limited to the particular components illustrated in FIG. 1 and/or to the manner in which the various components of system 100 are arranged. For instance, in various implementations, some elements of system 100 such as, for example, inter-layer prediction modules 116, 120 and 122 of encoder subsystem 101 may be implemented by a single inter-layer prediction module coupled to ail three of encoders 102, 104, and 106, and so forth.

Further, it may be recognized that encoder subsystem 101 may be associated with a content provider system including, for example, a server system and that bitstream 126 may be transmitted or conveyed to decoder subsystem 103 by various communications components or systems such as transceivers, antennae, network systems and the like not depicted in FIG. 1. It may also be recognized feat decoder subsystem 103 may be associated with a client system such as a computing device (e.g., a computer, smart phone or the like)

that receives bitstream 126 via various communications components or systems such as transceivers, antennae, network systems and the like also not depicted in FIG. 1.

Figure 2:
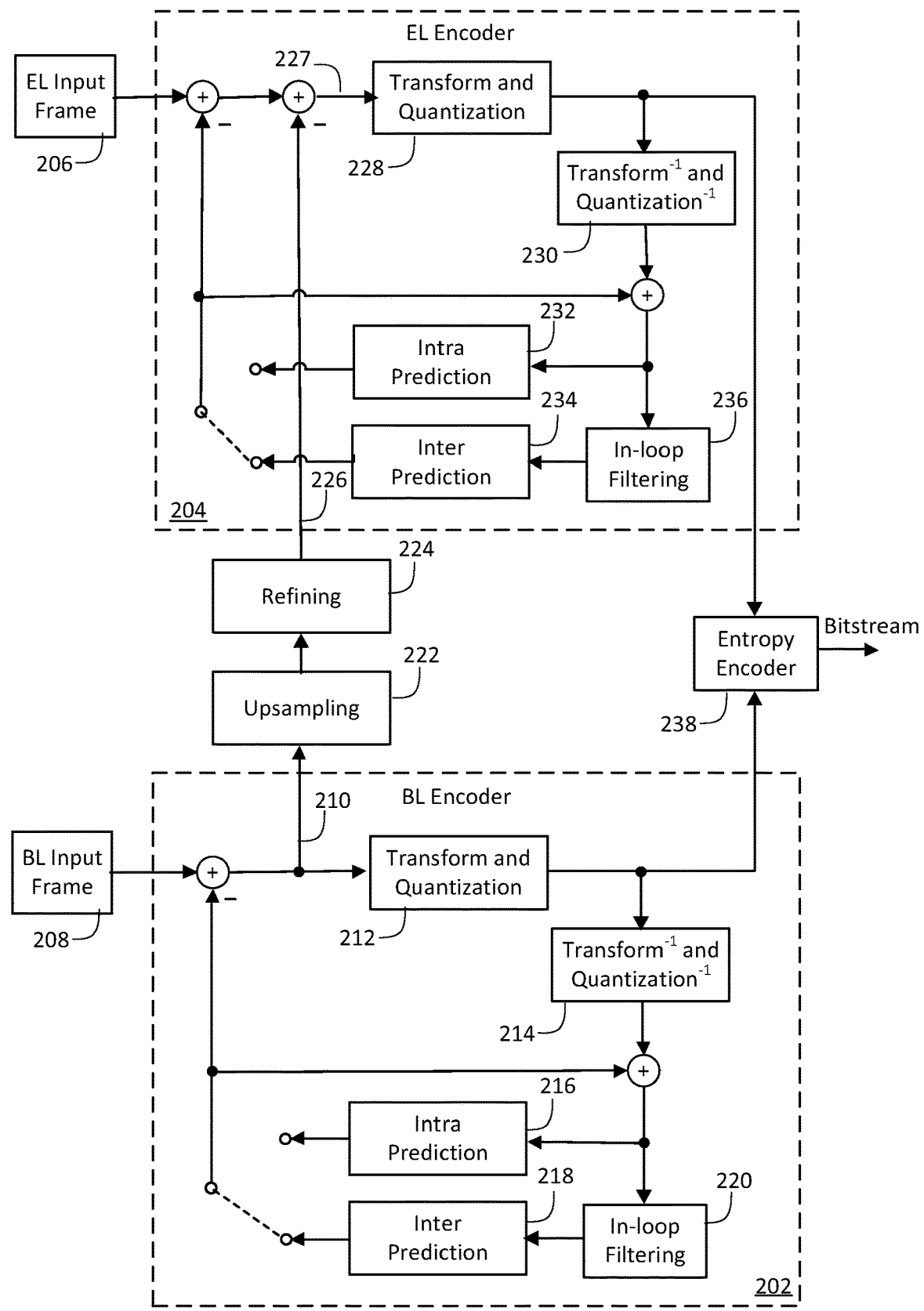
FIG. 2 is an illustrative diagram of an example encoding system.

FIG. 2 illustrates an example SVC encoding system 200 in accordance with the present disclosure. System 200 includes a reference BL encoder 202 and a target EL encoder 204 that may correspond, for example, to encoder 102 and encoder 104, respectively, of system 100. While system 200 includes only two encoders 202 and 204 corresponding to two SVC coding layers, any number of SVC coding layers and corresponding encoders may be utilized in accordance with the present disclosure in addition to those depicted in FIG. 2. For example, additional encoders corresponding to additional enhancement layers may be included in system 200 and may interact with the BL encoder 202 in a similar manner to that to be described below with respect to EL encoder 204.

When employing system 200 to undertake SVC coding, various blocks of a picture or image frame in the enhancement layer, such as EL input frame 206, may be predicted by EL encoder 204 horn a picture such as BL input frame 208 as processed by BL encoder 202 or from other pictures in the same enhancement layer that were previously encoded by EL encoder 204. As will be described in greater detail below, when undertaking later-layer residual prediction operations using system 200, pixels of pictures in layer 204, such as EL input frame 206, may be predicted using residual 210 provided by BL encoder 202. As noted above, EL input frame 206 may be coded in units corresponding to one or more blocks of pixel values and that the blocks to be coded may be in fee form of CDs, or PUs. Further, the coding may be applied at a slice, picture, or layer level.

Residual 210 used for inter-layer residual prediction may be obtained from the processing of BL input frame 208 using a coding loop that includes a transform and quantization module 212, an inverse transform and quantization module 214, an intra prediction module 216, an inter prediction module 218, and an in-loop filtering module 220. In particular, when operating BL encoder 202 to perform inter prediction using inter prediction module 218, residual 210 may be obtained from the output of in-loop filtering module 220. The functionality of modules 212, 214, 216, 218 and 220 are well recognized in the art and will not be described in any greater detail herein.

As will be described in greater detail below, in some implementations, residual 210 may be processed by an upsampling module 222 and/or a refining module 224 before being supplied to EL encoder 204. In various implementations, upsampling module 222 and refining module 224 may be components of an inter-layer prediction module (e.g., inter-layer prediction module 116 of system 100). Further, in various implementations, at least portions of upsampling module 222 and refining module 224 may be provided by hardware logic such as fixed function circuitry.

At EL encoder 204, filtered residual 226 provided by refining module 224 may be used to predict a residual 227 for EL input frame 206 using a coding loop that includes a transform and quantization module 228 and an inverse transform and inverse quantization module 230. When operated to undertake inter-layer residual prediction of EL input name 206, EL encoder 204 may not employ any of an intra prediction module 232, an inter prediction module 234, or an in-loop filtering module 236. Again, the functionality of modules 228, 232, 234, and 236 are well recognized in the art and will not be described in any greater detail herein.

In various implementations either or both of BL encoder 202 and EL encoder 204 may provide compressed coefficients corresponding to coded residuals of at least some of BL input frame 208 and of at least some of EL input frame 206, respectively, to an entropy encoder module 238. Module 238 may then perform lossless compression of the residuals and provide a multiplexed SVC bitstream included the encoded residuals as output from system 200.

Figure 3:
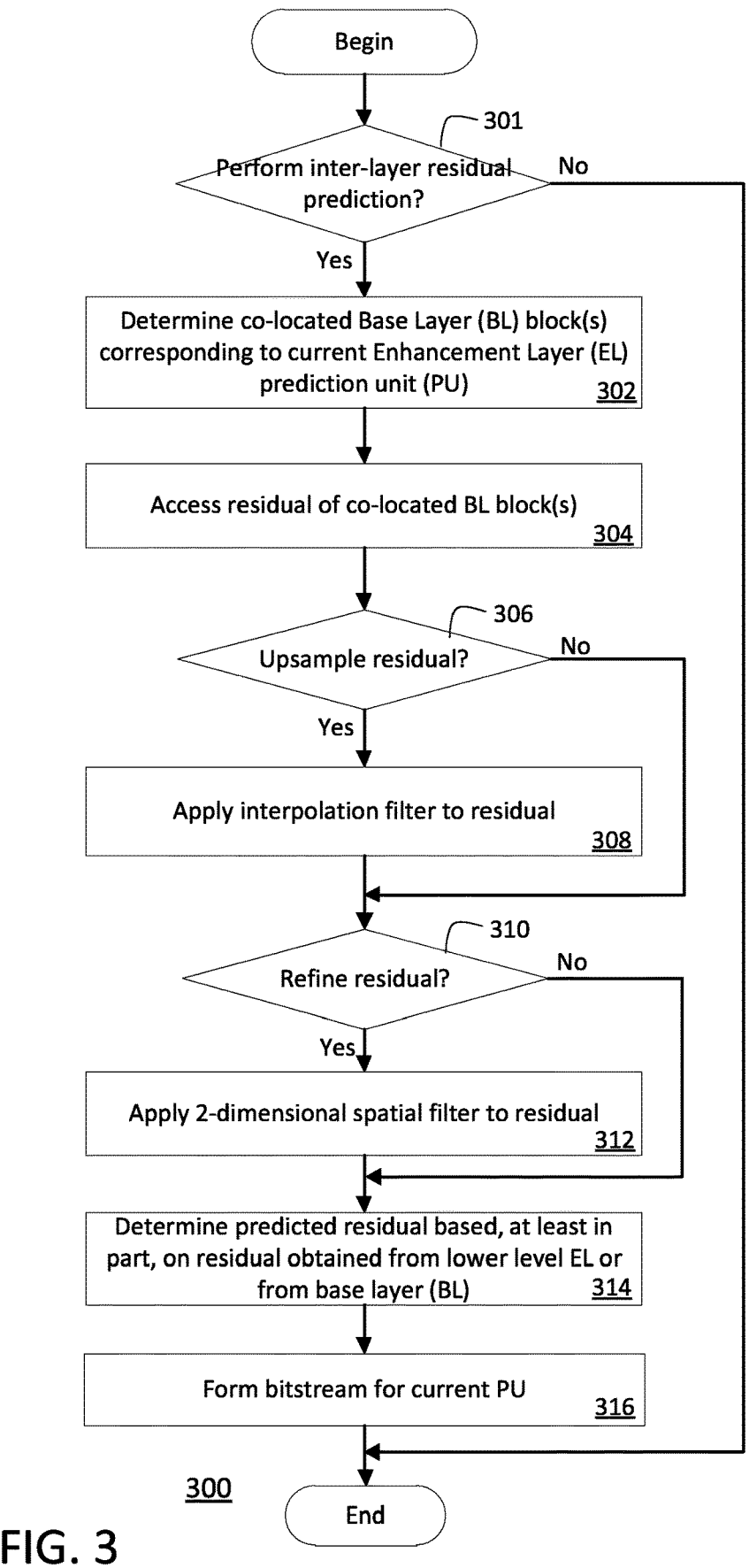
FIG. 3 is a flow diagram illustrating an example process.

FIG. 3 illustrates a flow diagram of an example process 300 according to various implementations of the present disclosure. Process 300 may include one or mom operations, functions or actions as illustrated by one or more of blocks 301, 302, 304, 306, 308, 310, 312, 314 and 316 of FIG. 3. By way of non-limiting example, process 300 may form at least part of a scalable video coding process for a portion of an EL layer (e.g., a PU in this implementation) as undertaken by encoder system 200.

Figure 4:
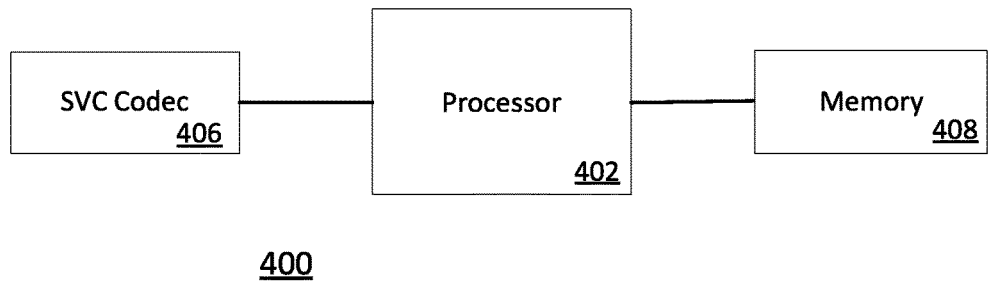
FIG. 4 is an illustrative diagram of an example system.

Further, process 300 will also be described herein in reference to coding an enhancement layer PU using the scalable video coding system 400 of FIG. 4 where system 400 includes processor 402, SVC codec module 406, and memory 408. Processor 402 may instantiate SVC codec module 406 to provide for inter-layer residual prediction in accordance with the present disclosure. In the example of system 400, memory 408 may store video content including at least some of BL input frame 208 and/or at least some of EL input frame 206, as well as other items such as filter coefficients and the like as will be explained in greater detail below, SVC codec module 406 may be provided by any combination of software logic, firmware logic, and/or hardware logic suitable for implementing coding system 200. Memory 408 may be any type of memory such as volatile memory (e.g., Static Random Access Memory (SRAM), Dynamic Random Access Memory (DRAM), etc) or non-volatile memory (e.g., flash memory, etc.), and so forth. In a non-limiting example, memory 408 may be implemented by cache memory.

Process 300 may begin at block 301 where a determination may be made regarding whether inter-layer residual prediction should be performed for a current EL PU. In various implementations, the determination of whether to perform inter-layer residual prediction may be based on rate-distortion cost. For example, SVC codec 406 may determine whether to perform inter-layer residual prediction for EL PU 502 based on known rate-distortion cost techniques. If inter-layer residual prediction Is to be performed then process 300 may continue at block 302, if, however, inter-layer residual prediction is not to be performed, then process 300 may end.

Figure 5:
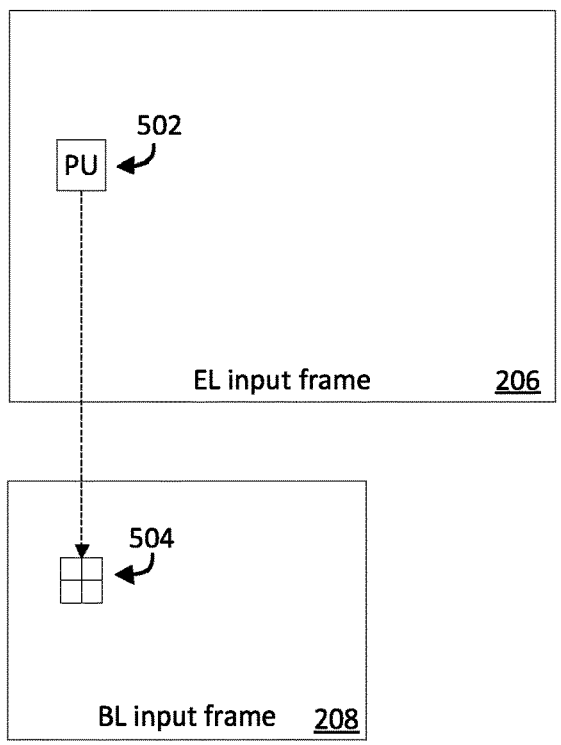
FIG. 5 is an illustrative diagram of an example coding scheme.

Process 300 may continue at block 302 where, for the current PU, one or more co-located blocks of a lower EL or a BL corresponding to the PU may be determined. For example, FIG. 5 illustrates a current PU 502 of EL input frame 206 where PU 502 corresponds spatially to co-located blocks 504 of BL input frame 208. In this example, PU 502 corresponds to four co-located blocks 504 of BL input frame 208. However, in various implementations, depending on the spatial sealing between an EL and a BL or lower level EL, any number of BL or lower level EL blocks may be co-located with respect to a particular PU. In other implementations, only a portion of a BL or lower level EL block may be co-located with an EL PU. Further, in some scalable video coding implementations where spatial scaling is not applied so that the EL and lower EL or BL have a spatial ratio of one (e.g., when quality sealing is applied between video layers without spatial scaling) there may be a one-to-one correspondence between blocks in an EL and blocks in a lower EL or in a BL.

With respect to the example of FIG. 5, determining co-located blocks at block 302 may involve marking or otherwise labeling blocks 504 as being co-located with respect to the current PU 502. Further, in various implementations, the co-located blocks in the BL or lower EL layer may be intra coded, inter coded, and/or may be hybrid intra/inter coded, in addition, different blocks in a set of co-located blocks may have different coding. For instance, in a non-limiting example, co-located blocks 504 may have mixed coding modes so dial two of the co-located blocks may be intra coded, one of the co-located blocks may be inter coded, and the remaining co-located block may be hybrid intra/inter coded.

In various implementations, inter-layer residual prediction may be employed regardless of how the co-located BL blocks have been coded. In other implementations, inter-layer residual prediction may or may not be performed based on the coding applied to the co-located BL blocks. For instance, in some implementations, when the co-located BL blocks of an EL PU include a mix of inter coded and intra coded blocks, inter-layer residual prediction may be performed for only that region of the PU corresponding to inter coded BL blocks. Conversely, in other implementations, inter-layer residual prediction may be performed for only that region of the PU corresponding to intra coded BL blocks. In yet other implementations, inter-layer residual prediction may be performed when the co-located BL blocks have been coded in various coding modes including, but not limited to, inter skip mode, inter_2N×2N, inter_2N×N, inter_N×2N, inter_N×N, and Asymmetric Motion Partitions (AMP) mode.

Process 300 may continue at block 304 where the residual corresponding to the co-located blocks may be accessed. For instance, referring to FIGS. 4 and 5, block 304 may involve SVC codec 406 using processor 402 to obtain, from memory 408, residual data corresponding to co-located blocks 504. For instance, memory 408 may act as a frame buffer for temporarily storing video content such as residual data corresponding to blocks 504.

At block 306 a determination may be mace with regard to performing upsampling of the residual obtained at block 304. For instance, in the example of FIG. 5 where PU 502 corresponds to four co-located blocks 504, the residual corresponding to blocks 504 may need to be upsampled to match the size of PU 502 and process 300 may proceed to block 308. In other implementations, such as when spatial scalability is not provided, upsampling may not be performed and process 300 may skip from block 306 to block 310 so that block 308 may not be performed.

In various implementations, upsampling of the residual at block 308 may be performed by applying an Interpolation filter to the residual although fee present disclosure is not limited to any particular form of upsample filtering. In various implementations, upsampling the residual may improve the accuracy of inter-layer residual prediction and may result in better compression performance for an EL. In various implementations, a fixed interpolation filter or an adaptive interpolation filter may be applied at block 308. For Implementations employing a fixed upsampling filter, the filter coefficients may be predetermined and may be used by both an encoder (e.g., system 200) and a decoder (to be described in greater detail below). For implementations employing an adaptive upsampling filter, the filter coefficients may be adaptively determined (e.g., by training) at the encoder and then may be sent to the decoder as part of a bitstream as will be explained further below. In various implementations, the interpolation filter applied at block 308 may be a multi-tap poly-phase interpolation filter. Further, in various implementations, block 308 may involve SVC codec 406 using hardware logic, such as fixed function circuitry, in processor 402 to apply interpolation filter coefficients obtained from memory 408 to the residual.

Process 300 may continue at block 310 where a determination may be made with regard to refining either the residual obtained at block 304 or the upsampled residual resulting from block 308. In various implementations, applying a refining filter to the residual may improve fee accuracy of inter-layer residual prediction and may result in better compression performance for an EL. If refining is chosen, process 300 may, in some implementations, proceed to block 312 where a 2-dimensional (2D) spatial filter may be applied as a refining filter although the present disclosure is not limited to any particular type of refining filter. In other implementations, spatial filtering may not be performed and process 300 may skip horn block 310 to block 314 so feat block 312 may not be performed. Further, in various implementations, block 312 may involve SVC codec 406 lasting hardware logic, such as fixed function circuitry, in processor 402 to apply refining filter coefficients obtained from memory 408 to die residual.

In various implementations, if r represents a center residual value before filtering, and surrounding residual values $q_{i,j}$(i,j=0, . . . , N) represent the 2D filter window, the refining filter applied at block 312 may determine a corresponding filtered center residual value r' according to the following formula:

$$r'=\Sigma_{i,j=0}^{N} q_{i,j} \times a_{i,j}+b$$

where $a_{i,j}$(i,j=0, . . . , N) are filter coefficients and b is an offset factor.

In various implementations the filter coefficients $a_{i,j}$ may be fixed or may be adaptive. In implementations where the filter coefficients are fixed the filter coefficients $a_{i,j}$ and the offset factor b may be predetermined and employed by both the encoder and the decoder. In implementations where the filter coefficients are adaptive the filter coefficients $a_{i,j}$ and the offset factor b may be adaptively determined (e.g., by training) at the encoder and then may be sent to the decoder as part of a bitstream as will be explained further below.

Referring to system 400, in various implementations the application of filters at blocks 308 and 312 may be undertaken by SVC codec 406 using processor 402 to obtain filler coefficients from memory 408. In adaptive filter implementations, SVC codec 406 may use processor 402 to adoptively determine filter coefficients that may, or may not, be stored in memory 408.

Process 300 may continue at block 314 where the residual (filtered or otherwise) may be used to determine a predicted residual for the current EL PU. For instance, SVC codec 406 may use the residual obtained at block 304 and that may be filtered at block 308 and/or at block 310 to form a prediction signal for PU 502. In various implementations, block 314 may also involve the generation of a residual for the current EL PU using the lower layer residual obtained at blocks 304, 308, or 310. For instance, SVC codec 406 may generate a predicted residual corresponding to the difference between the lower layer residual (filtered or otherwise) obtained horn block 504 and the residual of PU 502. In various implementations, block 314 may be undertaken using hardware logic, such as fixed function, circuitry, to perform the arithmetic operations needed to determine the predicted residual. Moreover, such hardware logic may permit parallel determination of predicted residuals for various portions of the current PU and/or for multiple PUs. As used herein, a "predicted residual" may refer to the value of residual data in the current PU that may be predicted based on residual data obtained from one or more PUs of one or more lower layers.

Process 300 may conclude at block 316 where a bitstream may be formed for the current EL PU. In various implementations, block 316 may involve forming a bitstream portion corresponding to the current EL PU where the bitstream portion includes a header portion and a data portion where the data portion includes a compressed predicted residual for the current EL PU. In various implementations, the header portion may include one or more indicators (such as one or more Sags) to indicate whether or not to perform inter-layer residual prediction for a current EL PU.

Further, in various implementations, filter coefficients corresponding to either the upsampling filter coefficients of block 308 or the refining filter coefficients of block 312 may be either indicated in or may be included in the bitstream formed at block 316. For example, if adaptive filter coefficients are employed at either of blocks 308 or 312, the filter coefficient valises may be included in either the header portion or the data portion of the bitstream formed at block 316. In other implementations, if predetermined filter coefficients are employed at either of blocks 308 or 312, the filter coefficients employed may be indicated, for example, in the header portion of the bitstream formed at block 316.

Figure 6:
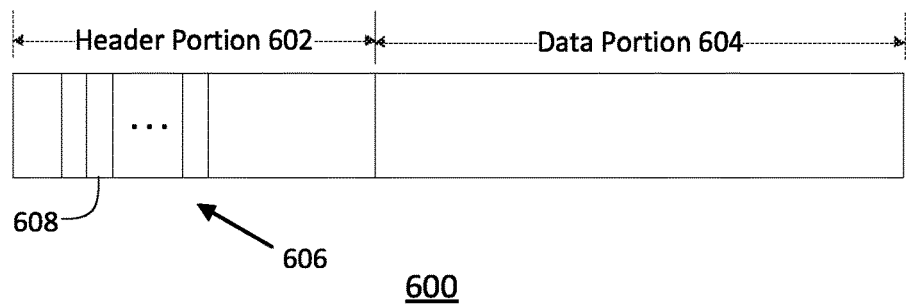
FIG. 6 is an illustrative diagram of an example bitstream.

FIG. 6 illustrates an example bitstream portion 600 corresponding to an EL PL in accordance with various implementations of the present disclosure. Portion 600 includes a header portion 602 and a data portion 604. Header portion 602 includes one or more indicators 606. For instance, indicators 606 may include an indicator 608 whose value specifies whether or not to perform inter-layer residual prediction for the EL PU. For example, in one implementation, indicator 608 may be labeled as a "inter_layer_residual_prediction_flag" and may be added to the PU syntax table to indicate whether or not the current PU (e.g., PU 502) uses inter-layer residual prediction.

While process 300 has been described herein in the context of FIG. 5, the present disclosure is not limited to the performance of inter-layer residual prediction in which all pixels of an EL PU are predicted from residual data derived from the same co-located BL blocks. Thus, in various implementations, a portion of a PU (e.g., only some blocks of a PU) may be predicted with respect to only some of die co-located blocks while another portion of the PU may be predicted with respect to others of the co-located blocks. For example, for a PU that corresponds to four co-located BL blocks, a first, upper portion of the PU may be predicted based on the two upper, horizontally adjacent co-located BL blocks, while a second, lower portion of die PU may be predicted based on the two lower, horizontally adjacent co-located BL blocks.

Further, in various implementations, different portions of a PU may be predicted from different co-located BL blocks having different coding. Continuing the example from above, the two upper, horizontally adjacent co-located BL blocks may have been intra coded, while the two lower, horizontally adjacent co-located BL blocks may have been inter coded. Thus, the first portion of the PU may be predicted from intra coded residual data, while the second portion of the PU may be predicted from inter coded residual data.

Figure 7:
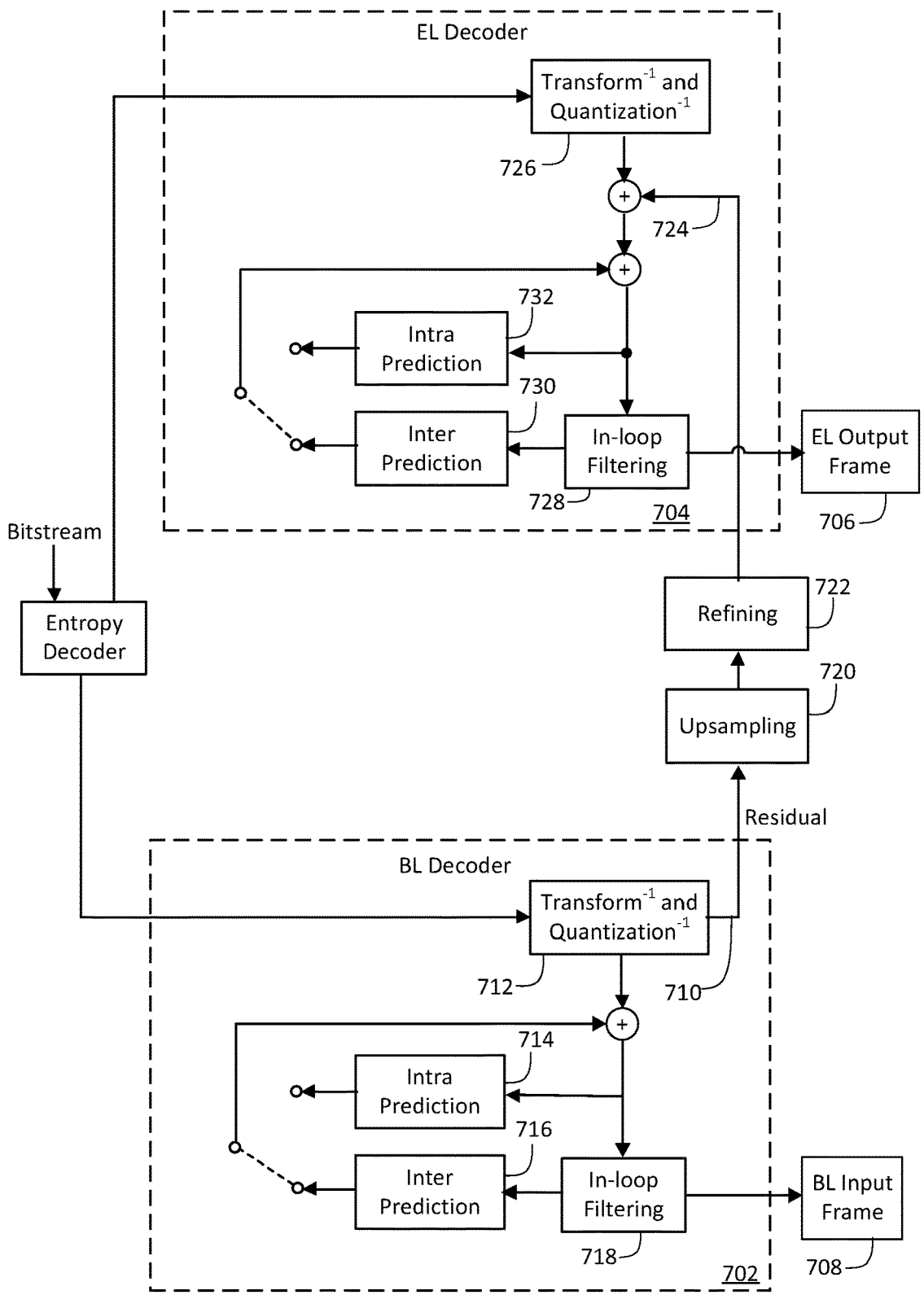
FIG. 7 is an illustrative diagram of an example decoding system.

FIG. 7 illustrates an example SVC decoding system 700 in accordance with the present disclosure. System 700 includes a reference or BL decoder 702 and a target or EL encoder 704 that may correspond. For example, to decoder 108 and decoder 110, respectively, of system 100. While system 700 includes only two decoders 702 and 704 corresponding to two SVC coding layers, any number of SVC coding layers and corresponding decoders may be utilized in accordance with the present disclosure in addition to those depicted in FIG. 7. For example, additional decoders corresponding to additional enhancement layers may be included in system 700 and may interact with the BL decoder 702 in a similar manner to that to be described below with respect to EL decoder 704.

When employing system 700 to undertake SVC coding, a picture or Image frame In the enhancement layer, such as EL output frame 706, may be predicted by EL decoder 704 from a picture such as BL output frame 708 as processed by BL decoder 702 or from other pictures in the same enhancement layer that were previously encoded by EL decoder 704. As will be described in greater detail below, when undertaking inter-layer residual prediction operations using system 700, residuals of pictures in layer 704, such as EL output frame 706, may be predicted using a residual 710 provided by BL decoder 702. Residual 710 may be obtained as the output of an inverse transform and quantization module 712, BL decoder 702 may also include an intra prediction module 714, an inter prediction module 716, and an in-loop filtering module 718.

As described in greater detail below, residual 710 may be processed by an upsampiing module 720 and a refining module 722 before being supplied to EL decoder 704. In various implementations, upsampiing module 720 and refining module 722 may be components of an inter-layer prediction module (e.g., inter-layer prediction module 130 of system 100). At EL decoder 704, a filtered residual 724 provided by refining module 722 may be used to predict a residual in EL output frame 706 in combination with the output of an inverse transform and quantization module 726, an in-loop filtering module 728, and an inter prediction module 730. When operated to undertake inter-layer residual sample prediction of EL output frame 706, EL decoder 704 may not employ an intra prediction module 732.

Various components of the systems described herein may be implemented in software logic, firmware logic, and/or hardware logic and/or any combination thereof. For example, various components of system 700 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, systems 200 and 700 may include additional components such as bitstream multiplexer modules and the like that have not been depicted in FIGS. 2 and 7 in the interest of clarity.

Figure 8:
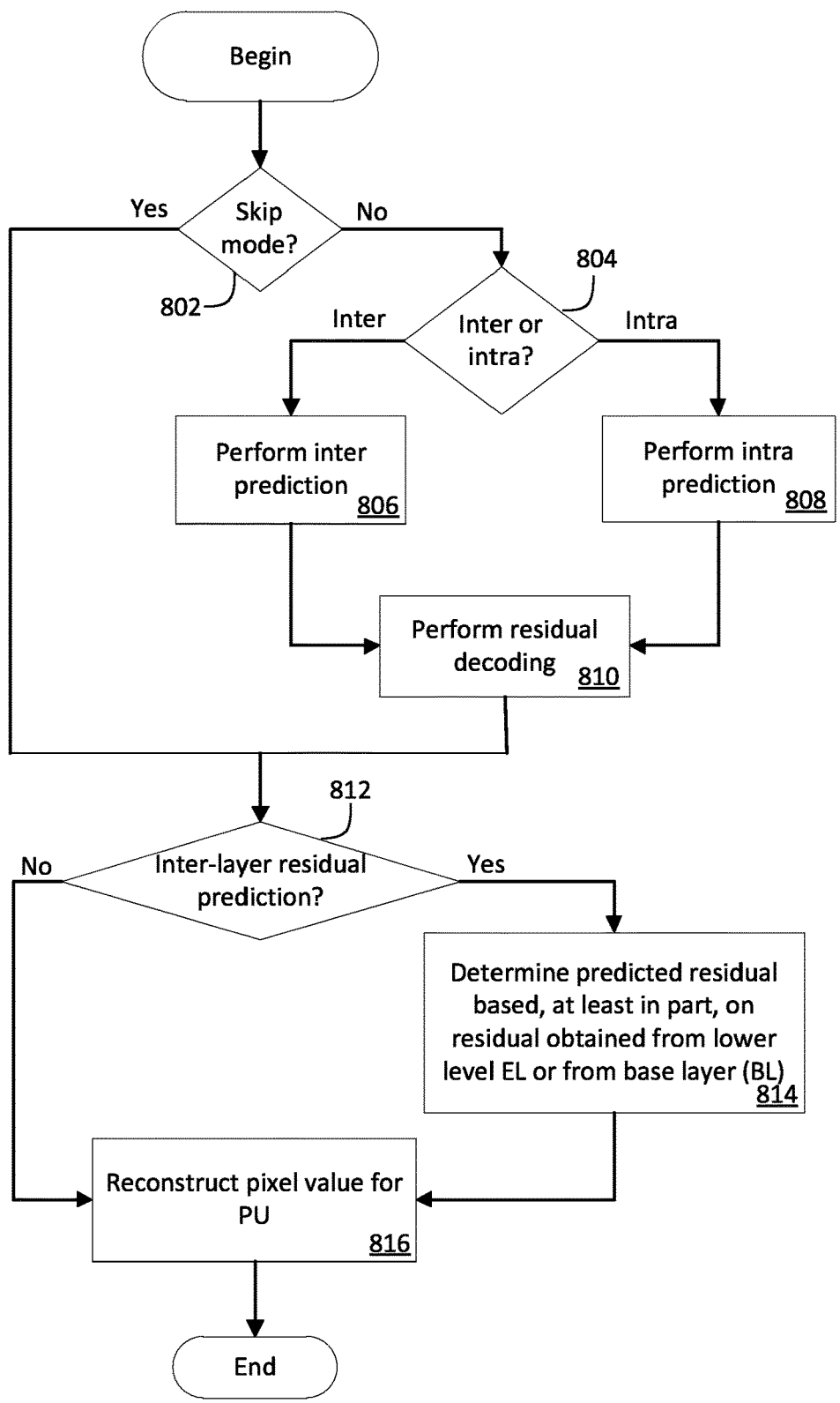
FIG. 8 is a flow diagram illustrating an example process.

FIG. 8 illustrates a flow diagram of an example process 800 according to various implementations of the present disclosure. Process 800 may Include one or more operations, functions or actions as illustrated by one or more of blocks 802, 804, 806, 808, 810, 812, 814, and 816 of FIG. 8. By way of non-limiting example, process 800 may form at least part of a scalable video coding process for a portion of an EL layer (e.g., a PU in this implementation) as undertaken by decoder system 700. Further, process 800 will also be described herein in reference to coding an enhancement layer FU using the scalable video coding system 400 of FIG. 4 where SVC codec module 406 may instantiate decoder system 700, and to example bitstream 600 of FIG. 6.

Process 800 may begin at block 802 where a determination may be made as to whether to undertake skip mode for a current EL PU being decoded in which the current PU would be decoded based on one or more previously decoded PCs. In various implementations, SVC codec 406 may undertake block 802 in response to the value of an indicator received In header portion 602 of bitstream 600. For Instance, if the indicator has a first value (e.g., one) then SVC codec 406 may determine to undertake skip mode for die current PU. If, on the other hand, the indicator has a second value (e.g., zero) then SVC codec 406 may determine to not undertake skip mode for the current PU.

If block 802 results in a negative determination then process 800 may proceed to block 804 where a determination may be made regarding whether to perform intra or inter coding for the PU. If intra prediction is chosen then process 800 may proceed to block 808 where intra-layer intra prediction may be performed using known intra prediction techniques. If inter prediction is chosen then process 800 may proceed to block 806 where infra-layer inter prediction may be performed using known inter prediction techniques. In various implementations, SVC codec 406 may undertake blocks 804, 806, and 808 using, for example, intra prediction module 730 of decoder 704 to undertake block 808, and inter prediction module 732 of decoder 704 to undertake block 806.

Process 800 may continue at block 810 where residual decoding may be undertaken using known residual decoding techniques and the results of either block 806 or 808. Process 800 may then conclude at block 814 where die PU pixel values may be reconstructed using known techniques and the results of block 812.

Returning to discussion of block 802, if block 802 results in a positive determination, and skip mode is invoked for the PU, then process 800 may proceed to block 812 where a determination may be made as to whether to perform inter-layer residual prediction for the current PU. In various implementations, SVC codec 406 may undertake block 812 in response to the value of indicator 608 received in header portion 602 of bitstream 600. For instance, if indicator 608 has a first value (e.g., one) then SVC codec 406 may determine to undertake inter-layer residual sample prediction for the current. PU if, on the other hand, indicator 608 has a second value (e.g., zero) then SVC codec 406 may determine to not undertake inter-layer residual sample prediction for the current PU.

If block 812 results in a positive determination then process 800 may proceed to block 814 where a predicted residual may be determined from the lower layer residnal(s) in a manner similar to that described above with respect to process 300. In various implementations, SVC codec 406 may undertake block 814 in response to indicator 608 having a first value (e.g., one). SVC codec 406 may then, for example, obtain residual data corresponding to co-located lower EL or BP blocks, may or may not apply upsample filtering to the residual, and may or may not also apply a refining filter to the residual. Further, when undertaking upsample filtering and/or refinement filtering of residual data, SVC codec 406 may do so using filter coefficients either indicated by or transmitted in bitstream 600. Process 800 may conclude at block 814 where pixel values for the current PU may be reconstructed, based at least in pan on the inter-layer residual prediction performed at block 814.

While process 800 is described herein as a decoding process for an EL PU, the present disclosure is not limited to the performance of inter-layer residual prediction at the PU level. Thus, in various implementations, process 800 may also be applied to an CU or to a TU. Further, as noted previously, all inter-layer residual prediction processes described herein including process 800 may be applied in the context of any combination of temporal, spatial, and/or quality scalable video coding.

White implementation of example processes 300 and 800, as illustrated in FIGS. 3 and 8, may include the undertaking of all blocks shown in the order illustrated, the present disclosure is not hunted in this regard and in various examples, implementation of processes 300 and 800 may include the undertaking of only a subset of the blocks shown and/or in a different order than illustrated.

In addition, any one or more of the blocks of FIGS. 3 and 8 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the blocks shown in FIGS. 3 and 8 in response to program code and/or instructions or instruction sets conveyed to the processor by one or more machine-readable media. In general, a machine-readable medium may convey software in fee form of program code and/or instructions or instruction sets that may cause any of the devices and/or systems described herein to implement at least portions of video systems 100, 200, and 700 and/or SVC codec module 406.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
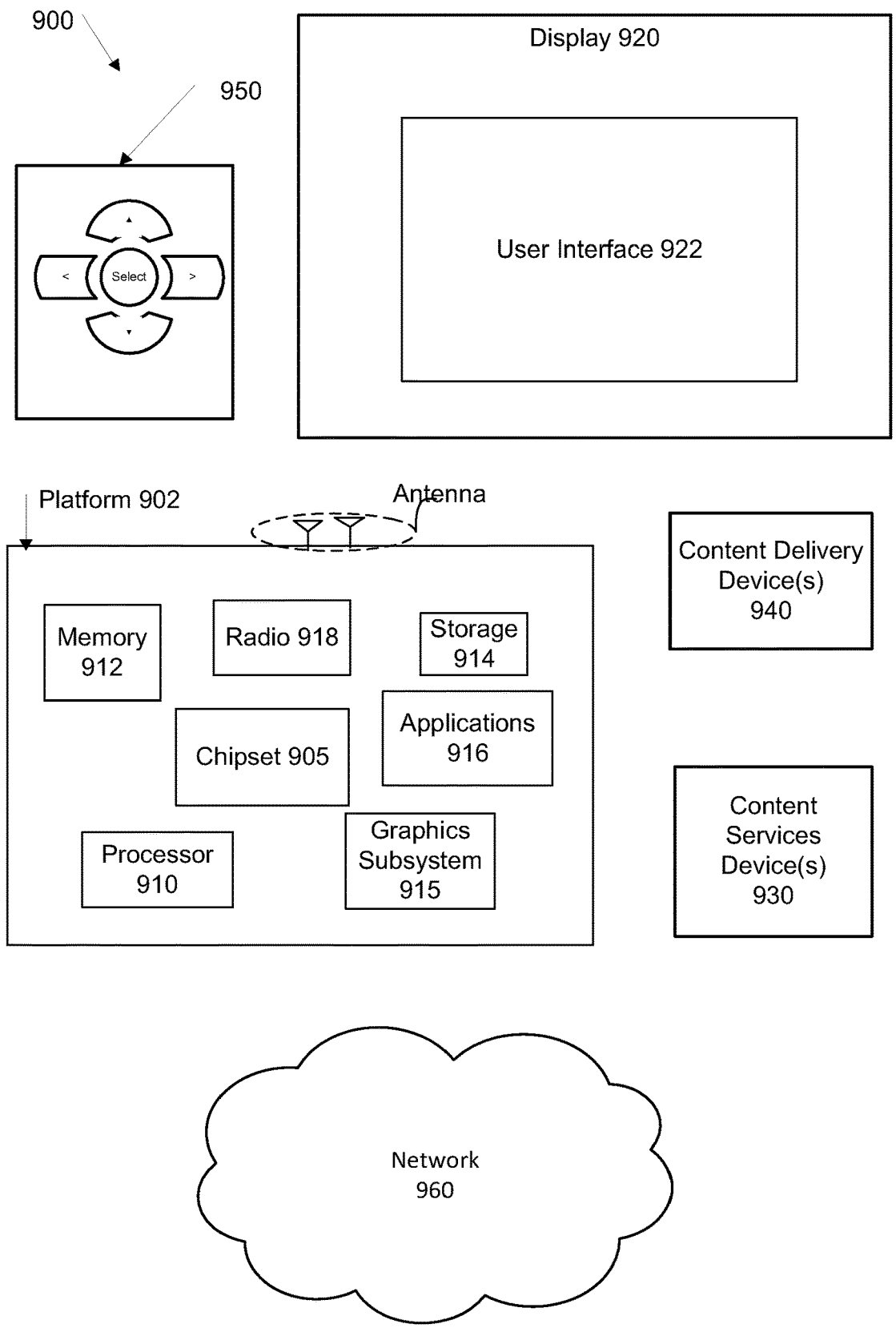
FIG. 9 is an illustrative diagram of an example system.

FIG. 9 illustrates an example system 900 in accordance with the present disclosure. In various implementations, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/FDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 900 includes a platform 902 coupled to a display 920. Platform 902 may receive content from a content device such as content services device(s) 930 or conical delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 910 may be dual-core processors), dual-core mobile processors), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, bet not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interlace, DisplayPort, wireless HDMI, and/or wireless HD compliant techniques. Graphics subsystem 915 may be integrated into processor 910 or chipset 905. In some implementations, graphics subsystem 915 may be a stand-alone device communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly, it will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In various embodiments, navigation controller 950 may be a pointing device that may be a computer hardware component (specifically, a human interlace device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In various embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off". In addition, chipset 905 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit tire present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, biters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
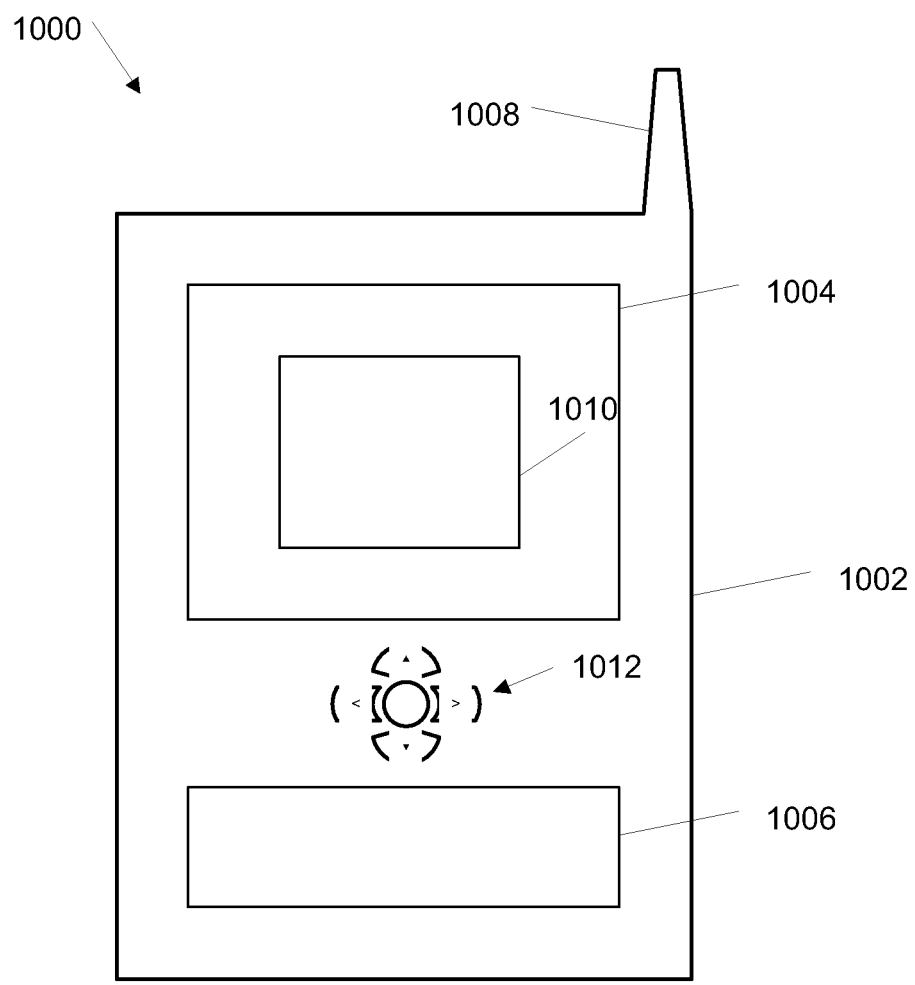
FIG. 10 illustrates an example device, all arranged in accordance with at least some implementations of the present disclosure.

As described above, system 900 may be embodied in varying physical styles or form factors. FIG. 10 illustrates implementations of a small form factor device 1000 in which system 1000 may be embodied. In various embodiments, for example, device 1000 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band con-muter, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing 1002, a display 1004, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within Ore processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic ox processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In accordance with the present disclosure, a residual obtained from a base layer video frame may be accessed at an enhancement layer video decoder and inter-layer residual prediction of at least a portion of an enhancement layer frame may be performed in response, at least hi part, to the base layer residual In some examples, performing inter-layer residual prediction may include generating a predicted residual. In some examples, the enhancement layer frame may be at least one of a temporal, spatial or quality enhancement layer frame. In some examples, performing inter-layer residual prediction may include performing inter-layer residual prediction on at least one of a slice, a picture, or a layer level. In some examples, the enhancement layer frame portion may be one of a Coding Unit (CU), Prediction Unit (PU), or a Transform Unit (TU).

In accordance with the present disclosure, performing inter-layer residual prediction may include performing inter-layer residual prediction in response to an indicator included in a bitstream received at the enhancement layer video decoder. In a first state, the indicator may specify that the enhancement layer video decoder is to pa-form inter-layer residual prediction, and, in a second state, the indicator may specify that the enhancement layer video decoder is to not to perform inter-layer residual prediction. In some examples, the indicator may be placed in one of the first state or the second state based on a rate-distortion cost. In some examples, the portion of the enhancement layer frame may include one or more blocks of the enhancement layer frame, and the residual may correspond to one or more co-located blocks of a base layer frame. In various examples, co-located blocks of the base layer frame may be intra coded blocks, inter coded blocks, or hybrid intra/inter coded blocks.

In accordance with the present disclosure, an upsample filter may be applied to the residual prior to performing inter-layer residual prediction. The upsample filter may have fixed upsample coefficients or may have adaptive upsample coefficients. Further, a refining filter may be applied to the residual prior to performing later-layer residual prediction, in some examples, the refining filter may have fixed refining coefficients or may have adaptive refining coefficients.

In accordance with the present disclosure, a residual obtained from a base layer video frame may be accessed at an enhancement layer video encoder and inter-layer residual prediction of at least a portion of an enhancement layer frame may be performed in response, at least in part, to the residual. In some examples, performing inter-layer residual prediction may include generating a predicted residual. Further, in some examples, the enhancement layer name may be entropy encoded after performing inter-layer residual prediction and a bitstream may be generated that includes die entropy encoded enhancement layer name.

In accordance with the present disclosure, an indicator may be generated, where, in a first state, the indicator specifies that inter-layer residual prediction is to be performed for the portion of an enhancement layer frame, and where, in a second state, the indicator specifies that inter-layer residual prediction is not to be performed for the portion of as enhancement layer frame. In some examples, the indicator may then be placed in the bitstream. In some examples, the indicator may be placed in one of the first state or the second state based on a rate-distortion cost.

What is claimed:

1. A method, comprising:
   at a scalable video decoder:
   accessing, for a block of an enhancement layer (EL) frame of scalable video content, multiple co-located blocks in one of a lower level EL frame or a base layer (BL) frame; and
   performing inter-layer residual prediction for a first region of the block of the EL frame responsive to a first block of the co-located blocks in the lower level EL frame or base layer (BL) frame corresponding to the first region being an intra coded block, wherein only regions of the block of the EL frame corresponding to intra coded blocks of the multiple co-located blocks in the lower level EL frame or base layer (BL) frame are inter-layer residual predicted, and wherein performing inter-layer residual prediction for the first region of the block of the EL frame comprises:
   determining a residual from the first block of the co-located blocks in the lower level EL frame or the BL frame;
   applying an upsample filter and a refining filter to the residual to generate an upsampled and filtered residual; and
   determining a predicted residual for the block of the EL frame based at least in part on adding the upsampled and filtered residual to a second residual of the first region of the block of the EL frame.

2. The method of claim 1, further comprising accessing the residual in memory.

3. The method of claim 1, wherein accessing the multiple co-located blocks for inter-layer residual prediction is in response to an indicator included in a bitstream received at the scalable video decoder.

4. The method of claim 3, wherein, in a first state, the indicator specifies that the scalable video decoder is to perform inter-layer residual prediction, and wherein, in a second state, the indicator specifies that the scalable video decoder is not to perform inter-layer residual prediction.

5. The method of claim 4, wherein the indicator has been placed in one of the first state or the second state based on a rate-distortion cost.

6. The method of claim 3, further comprising:
   determining a second block of the co-located blocks in the lower level EL frame or base layer (BL) frame corresponding to a second region of the block of the EL frame is an inter coded block, wherein inter-layer residual prediction is not performed for the second region responsive to the second block of the co-located blocks being an inter coded block.

7. The method of claim 6, wherein the upsample filter comprises adaptive upsample coefficients, the refining filter comprises adaptive refining coefficients, and the adaptive upsample coefficients and the adaptive refining coefficients are in the bitstream received at the scalable video decoder.

8. At least one non-transitory machine-readable medium comprising a plurality of instructions that, in response to being executed on a computing device, cause the computing device to perform scalable video decoding by:
   accessing, for a block of an enhancement layer (EL) frame of scalable video content, multiple co-located blocks in one of a lower level EL frame or a base layer (BL) frame; and
   performing inter-layer residual prediction for a first region of the block of the EL frame responsive to a first block of the co-located blocks in the lower level EL frame or base layer (BL) frame corresponding to the first region being an intra coded block, wherein only regions of the block of the EL frame corresponding to intra coded blocks of the multiple co-located blocks in the lower level EL frame or base layer (BL) frame are inter-layer residual predicted, and wherein performing inter-layer residual prediction for the first region of the block of the EL frame comprises:
      determining a residual from the first block of the co-located blocks in the lower level EL frame or the BL frame;
      applying an upsample filter and a refining filter to the residual to generate an upsampled and filtered residual; and
      determining a predicted residual for the block of the EL frame based at least in part on adding the upsampled and filtered residual to a second residual of the first region of the block of the EL frame.

9. The at least one machine-readable medium of claim 8, further comprising one or more instructions that, in response to being executed on the computing device, cause the computing device to access the residual in memory.

10. The at least one machine-readable medium of claim 8, wherein accessing the multiple co-located blocks for inter-layer residual prediction is in response to an indicator included in a bitstream received at the computing device, wherein, in a first state, the indicator specifies that the computing device is to perform inter-layer residual prediction, and wherein, in a second state, the indicator specifies that the computing device is not to perform inter-layer residual prediction.

11. The at least one machine-readable medium of claim 8, wherein the indicator has been placed in one of the first state or the second state based on a rate-distortion cost.

12. The at least one machine-readable medium of claim 10, further comprising one or more instructions that, in response to being executed on the computing device, cause the computing device to determine a second block of the co-located blocks in the lower level EL frame or base layer (BL) frame corresponding to a second region of the block of the EL frame is an inter coded block, wherein inter-layer residual prediction is not performed for the second region responsive to the second block of the co-located blocks being an inter coded block.

13. The at least one machine-readable medium of claim 12, wherein the upsample filter comprises adaptive upsample coefficients, the refining filter comprises one adaptive refining coefficients, and the adaptive upsample coefficients and the adaptive refining coefficients are in the bitstream received at the scalable video decoder.

14. An apparatus, comprising:
   memory to store scalable video content; and
   circuitry to access, for a block of an enhancement layer (EL) frame of the scalable video content, multiple co-located blocks in one of a lower level EL frame or a base layer (BL) frame, to perform inter-layer residual prediction for a first region of the block of the EL frame responsive to a first block of the co-located blocks in the lower level EL frame or base layer (BL) frame corresponding to the first region being an intra coded block, wherein only regions of the block of the EL frame corresponding to intra coded blocks of the multiple co-located blocks in the lower level EL frame or base layer (BL) frame are inter-layer residual predicted, and wherein to perform inter-layer residual prediction for the first region of the block of the EL frame, the circuitry is to access the memory to obtain a residual, wherein the residual is from the first block of the co-located blocks in the lower level EL frame or the BL frame, to apply an upsample filter and a refining filter to the residual to generate an upsampled and filtered residual, and to determine a predicted residual for the block of the EL frame based on an addition of the upsampled and filtered residual to a second residual of the first region of the block of the EL frame.

15. The apparatus of claim 14, wherein the circuitry to access the multiple co-located blocks for inter-layer residual prediction is in response to an indicator stored in the memory, wherein, in a first state, the indicator specifies that the circuitry is to perform inter-layer residual prediction, and wherein, in a second state, the indicator specifies that the circuitry is not to perform inter-layer residual prediction.

16. The apparatus of claim 15, wherein the indicator has been placed in one of the first state or the second state in response to a rate-distortion cost.

17. The apparatus of claim 15, wherein the circuitry is further to determine a second block of the co-located blocks in the lower level EL frame or base layer (BL) frame corresponding to a second region of the block of the EL frame is an inter coded block, wherein inter-layer residual prediction is not performed for the second region responsive to the second block of the co-located blocks being an inter coded block.

18. The apparatus of claim 17, wherein the upsample filter comprises adaptive upsample coefficients, the refining filter comprises adaptive refining coefficients, and the adaptive upsample coefficients and the adaptive refining coefficients are in the memory.

19. A method, comprising:
   at a scalable video encoder:
      determining a coding mode of a block of an enhancement layer (EL) frame of scalable video content;
      determining whether to perform inter-layer prediction for the block of the EL frame; and
      when inter-layer prediction is to be performed:
         accessing, for the block, multiple co-located blocks in one of a lower level EL frame or a base layer (BL) frame; and
         performing inter-layer residual prediction for a first region of the block of the EL frame responsive to a first block of the co-located blocks in the lower level EL frame or base layer (BL) frame corresponding to the first region being an intra coded block, wherein only regions of the block of the EL frame corresponding to intra coded blocks of the multiple co-located blocks in the lower level EL frame or base layer (BL) frame are inter-layer residual predicted, and wherein performing inter-layer residual prediction for the first region of the block of the EL frame comprises:
  determining a residual from the first block of the co-located blocks in the lower level EL frame or the BL frame;
  applying an upsample filter and a refining filter to the residual to generate an upsampled and filtered residual; and
  determining a second residual for the first region of the block of the EL frame based on differencing the upsampled and filtered residual with a predicted residual of the first region of the block of the EL frame.

20. The method of claim 19, further comprising accessing the residual in memory.

21. The method of claim 19, further comprising:
  entropy encoding the EL frame after determining the second residual; and
  generating a bitstream that includes the entropy encoded EL frame.

22. The method of claim 21, further comprising:
  generating an indicator, wherein, in a first state, the indicator specifies that inter-layer residual prediction is to be performed for the block, and wherein, in a second state, the indicator specifies that inter-layer residual prediction is not to be performed for the block; and
  including the indicator in the bitstream.

23. The method of claim 22, further comprising:
  determining a second block of the co-located blocks in the lower level EL frame or base layer (BL) frame corresponding to a second region of the block of the EL frame is an inter coded block, wherein inter-layer residual prediction is not performed for the second region responsive to the second block of the co-located blocks being an inter coded block.

24. The method of claim 23, wherein the upsample filter comprises adaptive upsample coefficients, the refining filter comprises adaptive refining coefficients, and the adaptive upsample coefficients and the adaptive refining coefficients are included in the bitstream.

25. At least one non-transitory machine-readable medium comprising a plurality of instructions that, in response to being executed on a computing device, cause the computing device to perform scalable video encoding by:
  determining a coding mode of a block of an enhancement layer (EL) frame of scalable video content;
  determining whether to perform inter-layer prediction for the block of the EL frame; and
  when inter-layer prediction is to be performed:
    accessing, for the block, multiple co-located blocks in one of a lower level EL frame or a base layer (BL) frame; and
    performing inter-layer residual prediction for a first region of the block of the EL frame responsive to a first block of the co-located blocks in the lower level EL frame or base layer (BL) frame corresponding to the first region being an intra coded block, wherein only regions of the block of the EL frame corresponding to intra coded blocks of the multiple co-located blocks in the lower level EL frame or base layer (BL) frame are inter-layer residual predicted, and wherein performing inter-layer residual prediction for the first region of the block of the EL frame comprises:
      determining a residual from the first block of the co-located blocks in the lower level EL frame or the BL frame;
      applying an upsample filter and a refining filter to the residual to generate an upsampled and filtered residual; and
      determining a second residual for the first region of the block of the EL frame based on differencing the upsampled and filtered residual with a predicted residual of the first region of the block of the EL frame.

26. The at least one machine-readable medium of claim 25, further comprising one or more instructions that, in response to being executed on the computing device, cause the computing device to access the residual in memory.

27. The at least one machine-readable medium of claim 25, further comprising one or more instructions that, in response to being executed on the computing device, cause the computing device to:
  entropy encode the EL frame after determining the second residual; and
  generate a bitstream that includes the entropy encoded EL frame.

28. The at least one machine-readable medium of claim 27, further comprising one or more instructions that, in response to being executed on the computing device, cause the computing device to:
  generate an indicator, wherein, in a first state, the indicator specifies that inter-layer residual prediction is to be performed for the block, and wherein, in a second state, the indicator specifies that inter-layer residual prediction is not to be performed for the block; and
  include the indicator in the bitstream.

29. The at least one machine-readable medium of claim 28, further comprising one or more instructions that, in response to being executed on the computing device, cause the computing device to:
  determine a second block of the co-located blocks in the lower level EL frame or base layer (BL) frame corresponding to a second region of the block of the EL frame is an inter coded block, wherein inter-layer residual prediction is not performed for the second region responsive to the second block of the co-located blocks being an inter coded block.

30. The at least one machine-readable medium of claim 29, wherein the upsample filter comprises adaptive upsample coefficients, the refining filter comprises adaptive refining coefficients, and the adaptive upsample coefficients and the adaptive refining coefficients are included in the bitstream.

* * * * *